US009639466B2

(12) United States Patent
Robertson et al.

(10) Patent No.: US 9,639,466 B2
(45) Date of Patent: May 2, 2017

(54) CONTROL MECHANISM FOR FINE-TUNED CACHE TO BACKING-STORE SYNCHRONIZATION

(71) Applicant: NVIDIA Corporation, Santa Clara, CA (US)

(72) Inventors: James Patrick Robertson, Austin, TX (US); Gregory Alan Muthler, Austin, TX (US); Hemayet Hossain, San Jose, CA (US); Timothy John Purcell, Provo, UT (US); Karan Mehra, Cary, NC (US); Peter B. Holmqvist, Cary, NC (US); George R. Lynch, Raleigh, NC (US)

(73) Assignee: NVIDIA Corporation, Santa Clara, CA (US)

( * ) Notice: Subject to any disclaimer, the term of this patent is extended or adjusted under 35 U.S.C. 154(b) by 170 days.

(21) Appl. No.: 13/664,387

(22) Filed: Oct. 30, 2012

(65) Prior Publication Data

US 2014/0122809 A1  May 1, 2014

(51) Int. Cl.
*G06F 12/08* (2016.01)
*G06F 12/0804* (2016.01)
(Continued)

(52) U.S. Cl.
CPC ........ *G06F 12/0804* (2013.01); *G06F 12/084* (2013.01); *G06F 12/0895* (2013.01); *G06F 12/0866* (2013.01); *G06F 12/0868* (2013.01)

(58) Field of Classification Search
CPC ............... G06F 12/0866; G06F 12/123; G06F 12/0897; G06F 12/0815; G06F 12/0868; G06F 12/0875; G06F 12/0864
See application file for complete search history.

(56) References Cited

U.S. PATENT DOCUMENTS 5,636,355 A * 6/1997 Ramakrishnan .... G06F 12/0804
                                                     711/113
5,809,525 A * 9/1998 Bishop et al. ................ 711/122
(Continued)

OTHER PUBLICATIONS

Memory Systems by Jacob, Ng, and Wang; Morgan Kaufman 2007; pp. 68, 83, 84, 130, 219, 220, and 242.*

(Continued)

*Primary Examiner* — Reginald Bragdon
*Assistant Examiner* — Paul Knight
(74) *Attorney, Agent, or Firm* — Artegis Law Group, LLP

(57) ABSTRACT

One embodiment of the present invention sets forth a technique for processing commands received by an intermediary cache from one or more clients. The technique involves receiving a first write command from an arbiter unit, where the first write command specifies a first memory address, determining that a first cache line related to a set of cache lines included in the intermediary cache is associated with the first memory address, causing data associated with the first write command to be written into the first cache line, and marking the first cache line as dirty. The technique further involves determining whether a total number of cache lines marked as dirty in the set of cache lines is less than, equal to, or greater than a first threshold value, and: not transmitting a dirty data notification to the frame buffer logic when the total number is less than the threshold value, or transmitting a dirty data notification to the frame buffer logic when the total number is equal to or greater than the first threshold value.

19 Claims, 9 Drawing Sheets

(51) Int. Cl.
  *G06F 12/084* (2016.01)
  *G06F 12/0895* (2016.01)
  *G06F 12/0868* (2016.01)
  *G06F 12/0866* (2016.01)

(56) References Cited

U.S. PATENT DOCUMENTS

| | | | | |
|---|---|---|---|---|
| 6,636,950 | B1* | 10/2003 | Mithal | G06F 9/3004 711/117 |
| 7,062,675 | B1* | 6/2006 | Kemeny | G06F 11/1441 711/135 |
| 8,060,700 | B1* | 11/2011 | Glasco et al. | 711/133 |
| 2003/0084248 | A1* | 5/2003 | Gaither et al. | 711/133 |
| 2003/0212866 | A1* | 11/2003 | Takahashi et al. | 711/144 |
| 2004/0049638 | A1* | 3/2004 | Ashmore et al. | 711/136 |
| 2004/0054851 | A1* | 3/2004 | Acton | G06F 11/1441 711/118 |
| 2005/0044311 | A1* | 2/2005 | Lahiri | G06F 12/0804 711/113 |
| 2005/0172082 | A1* | 8/2005 | Liu et al. | 711/144 |
| 2005/0278486 | A1* | 12/2005 | Trika | G06F 12/0866 711/142 |
| 2006/0294301 | A1* | 12/2006 | Zohar et al. | 711/113 |
| 2007/0094450 | A1* | 4/2007 | VanderWiel | 711/133 |
| 2008/0040583 | A1* | 2/2008 | Kra | 712/220 |
| 2009/0204765 | A1* | 8/2009 | Gupta et al. | 711/133 |
| 2009/0216944 | A1* | 8/2009 | Gill et al. | 711/113 |
| 2010/0211987 | A1* | 8/2010 | Chou | 725/119 |
| 2011/0010502 | A1* | 1/2011 | Wang et al. | 711/128 |
| 2011/0078379 | A1* | 3/2011 | Iida et al. | 711/118 |
| 2011/0208914 | A1* | 8/2011 | Winokur et al. | 711/119 |
| 2011/0320742 | A1* | 12/2011 | Lim et al. | 711/154 |
| 2012/0124294 | A1* | 5/2012 | Atkisson | G06F 11/108 711/135 |
| 2012/0284544 | A1* | 11/2012 | Xian et al. | 713/320 |
| 2013/0067168 | A1* | 3/2013 | Havewala et al. | 711/118 |
| 2013/0124802 | A1* | 5/2013 | Glasco et al. | 711/128 |

OTHER PUBLICATIONS

The Authoritative Dictionary of IEEE Standards Terms; IEEE 2000; pp. 104 and 455.*
Graphics Processing Unit (GPU) GPU: Changes Everything; Nvidia; as published on Jan. 24, 2009 at http://www.nvidia.com/object/gpu.html.*
Memory Systems; Jacob (Addition of pp. 59 and 517); Morgan Kaufmann 2007.*
On the Theory of Spatial and Temporal Locality; by Snir and Yu; University of Illinois 2005; pp. 2, 3, and 5.*
"Limiting the Number of Dirty Cache Lines" by Langen and Juurlink; IEEE 2009.*

* cited by examiner

CONTROL MECHANISM FOR FINE-TUNED CACHE TO BACKING-STORE SYNCHRONIZATION

BACKGROUND OF THE INVENTION

Field of the Invention

Embodiments of the present invention relate generally to the field of memory management and, more specifically, a control mechanism for fine-tuned cache to backing-store synchronization.

Description of the Related Art

One element of a memory subsystem within certain processing units is a Level 2 Cache memory (referred to herein as an "L2 cache"). The L2 cache serves as an intermediate storage area between an external memory and clients that interface with the memory subsystem. In particular, the L2 cache temporarily stores data that the clients are reading from and writing to the external memory. As a result, the data stored in the L2 cache is not always identical to the data stored in the external memory. Specifically, data stored in the L2 cache that is not also stored in the external memory is referred to herein as "dirty data," which remains in the L2 cache until the data has been "cleaned" by frame buffer logic included in the memory subsystem.

Cleaning dirty data out of the L2 cache is executed according to a variety of well-known techniques. One particular technique involves implementing logic within the memory subsystem (referred to herein as "L2 cache logic") that detects data writes into the L2 cache and then transmits notifications about the data writes to the frame buffer logic. More specifically, when dirty data is written into a line of the L2 cache, the L2 cache logic immediately transmits a dirty data notification to the frame buffer logic that indicates the line in the L2 cache that now includes dirty data. In turn, the frame buffer logic queues the notification for processing and eventually cleans the L2 cache by copying dirty data from the L2 cache to the external memory.

Notably, the evolution of computing is introducing new manners in which data is written into the L2 cache. Take, for example, a graphics application that is configured to execute a large number of write operations (i.e., updates) to data stored in a line of the L2 cache, where the intermediate form of the data is useless and the final form of the data is all that matters. In this example, the L2 cache logic described above generates and transmits to the frame buffer logic a number of dirty data notifications that corresponds to the number of writes made to the L2 cache line. For example, if the graphics application writes data into a first line of the L2 cache, and rapidly executes seven updates to the data in the first line, then eight dirty data notifications are transmitted from the L2 cache logic to the frame buffer logic. Considering that the final data (i.e., the data after the seventh update) is all that matters—and that one or more of the additional write operations may update the data before the frame buffer logic is able to respond to even the first dirty data notification sent in response to the first write operation—many of these dirty data notifications are superfluous and unneeded for the graphics application to execute properly. Moreover, these dirty data notifications consume energy and bandwidth of the communication channel between the L2 cache logic and the frame buffer logic, which decreases the overall efficiency of the memory subsystem.

As the foregoing illustrates, what is needed in the art is a technique to more effectively manage the transmission of notifications from the L2 cache logic to the frame buffer logic.

SUMMARY OF THE INVENTION

One embodiment of the present invention sets forth a method for processing commands received by an intermediary cache from one or more clients, where the intermediary cache is coupled to an external memory via frame buffer logic. The method includes the steps of receiving a first write command from an arbiter unit, wherein the first write command specifies a first memory address, determining that a first cache line related to a set of cache lines included in the intermediary cache is associated with the first memory address, causing data associated with the first write command to be written into the first cache line, marking the first cache line as dirty; and determining whether a total number of cache lines marked as dirty in the set of cache lines is less than, equal to, or greater than a first threshold value, and: not transmitting a dirty data notification to the frame buffer logic when the total number is less than the threshold value, or transmitting a dirty data notification to the frame buffer logic when the total number is equal to or greater than the first threshold value.

One advantage of the disclosed method over prior art is that it results in a write bandwidth reduction to the external DRAMs. The L2 cache holds on to a programmable amount of dirty data before the dirty data is exposed to the frame buffer logic and then written to external DRAM memory. The pool of unexposed dirty data gives write requests greater probability to coalesce in the cache, i.e., multiple writes to the same address can be processed by the cache and only the final resulting value is written to DRAM. Another benefit is that temporary data that is not yet exposed to the frame buffer can be immediately invalidated and erased from the cache without consuming DRAM bandwidth.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
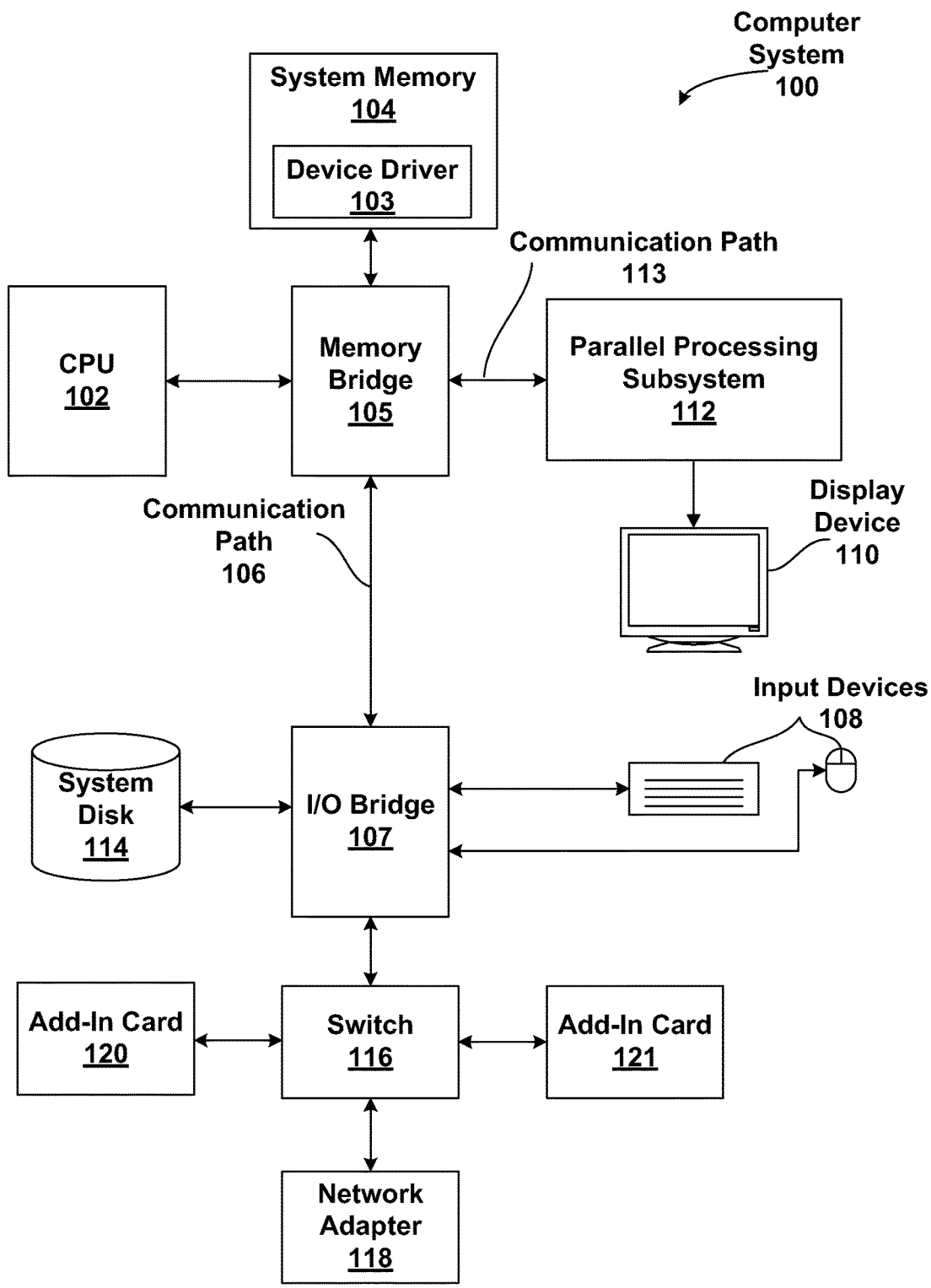
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
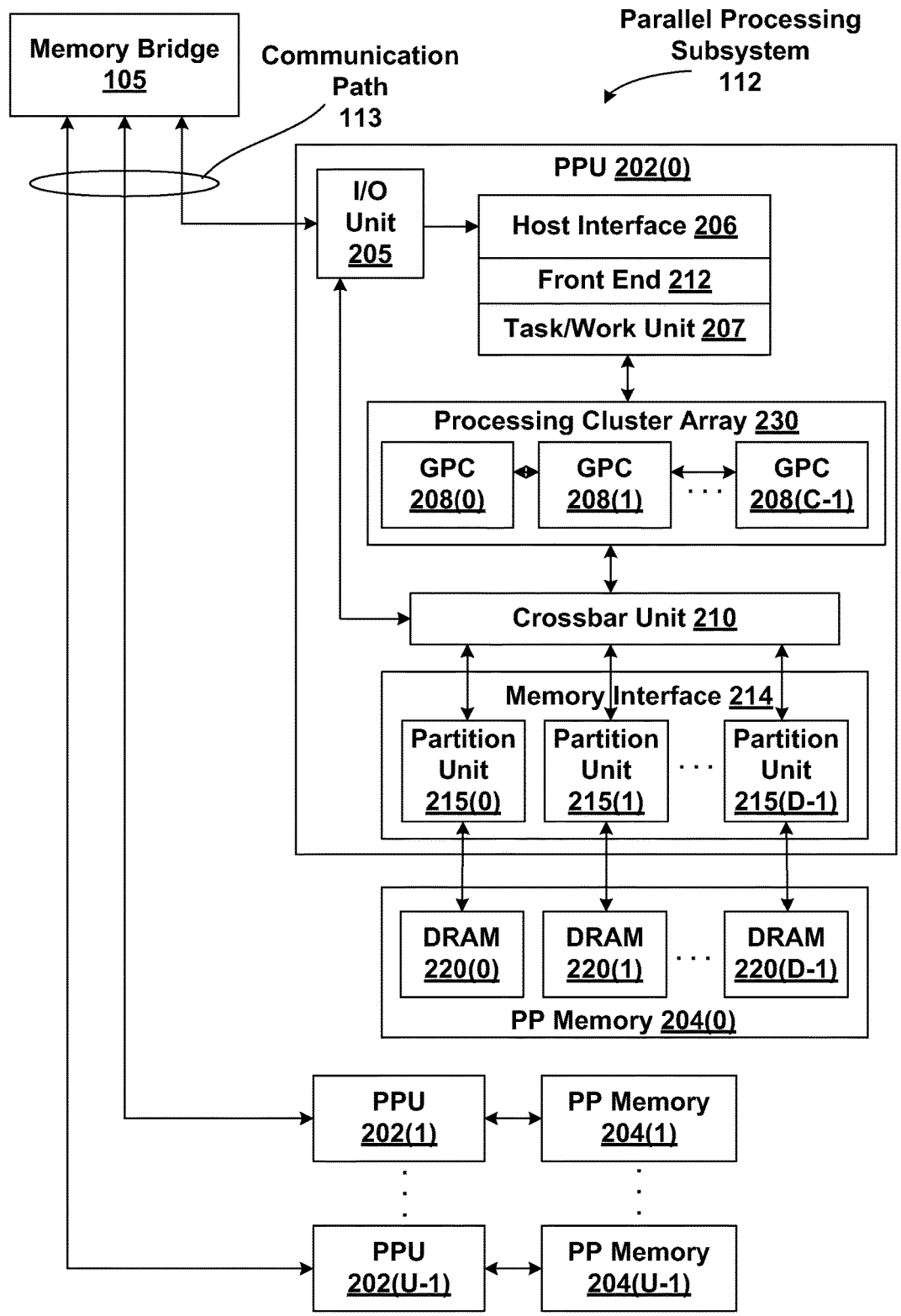
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U 1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D 1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
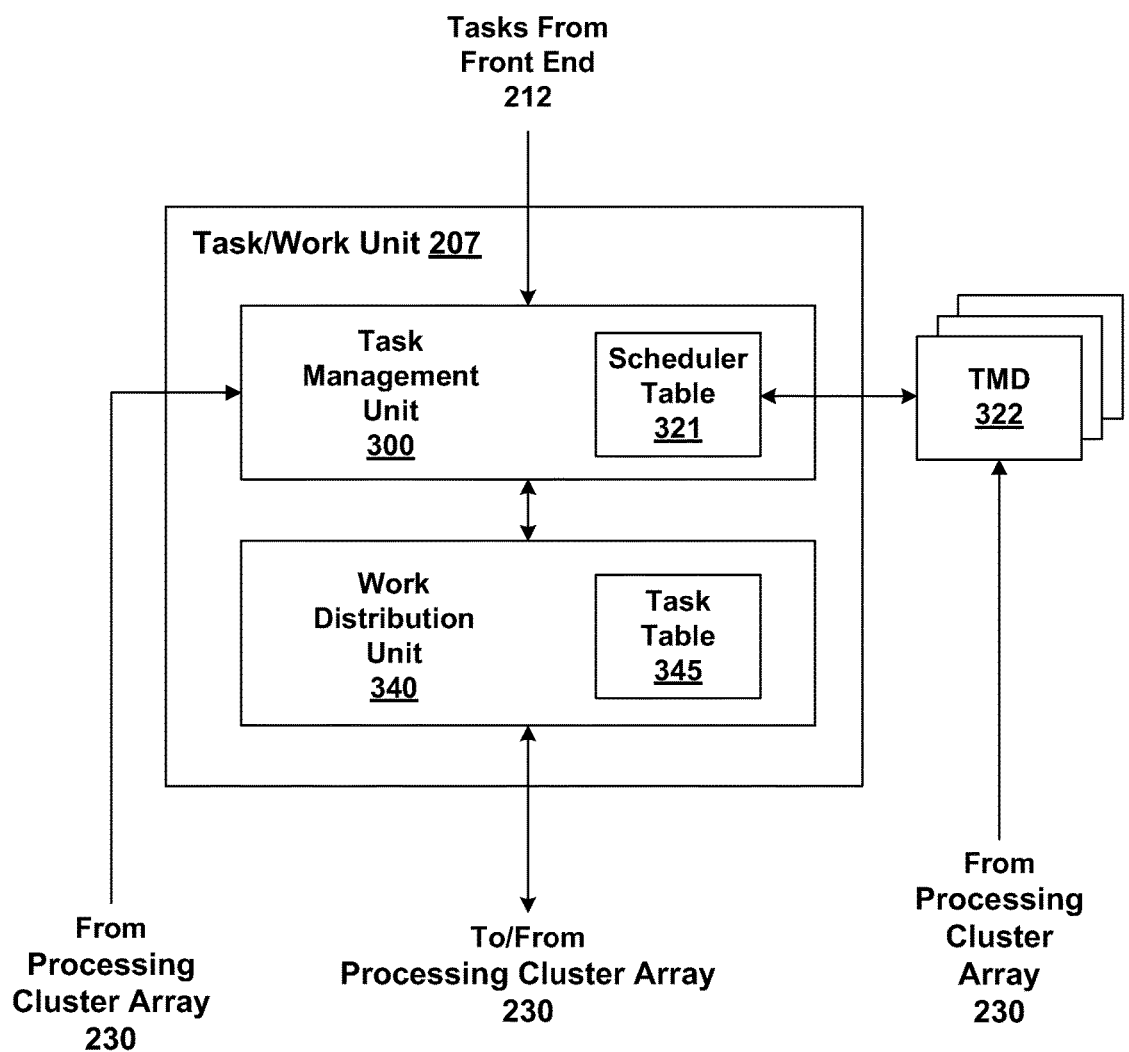
FIG. 3A is a block diagram of the front end unit of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
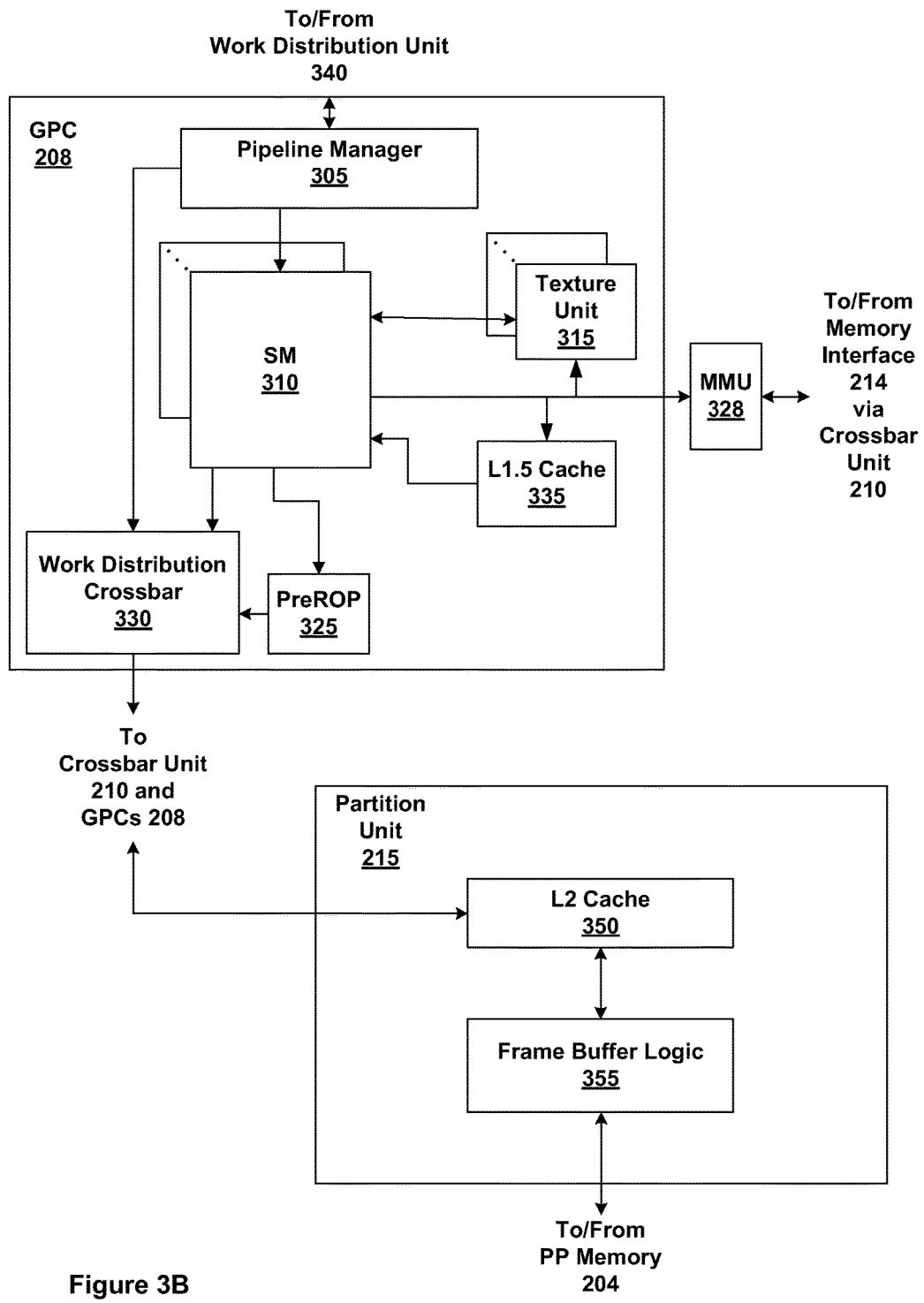
FIG. 3B illustrates a block diagram of a general processing cluster within one of the parallel processing units of FIG. 2, as well as a block diagram of a partition unit within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Also shown in FIG. 3B is a block diagram of a partition unit 215 within one of the PPUs 202 of FIG. 2, according to one embodiment of the present invention. As shown, partition unit 215 includes an L2 cache 350 and frame buffer logic 355. L2 cache 350 is a read/write cache that is configured to perform load and store operations received from crossbar unit 210. Read misses and urgent writeback requests are output by L2 cache 350 to the frame buffer logic 355 for processing. Dirty updates are also sent to the frame buffer logic 355 for opportunistic processing. The frame buffer logic 355 interfaces directly with parallel processing memory 204, outputting read and write requests and receiving data read from parallel processing memory 204.

Figure 3C:
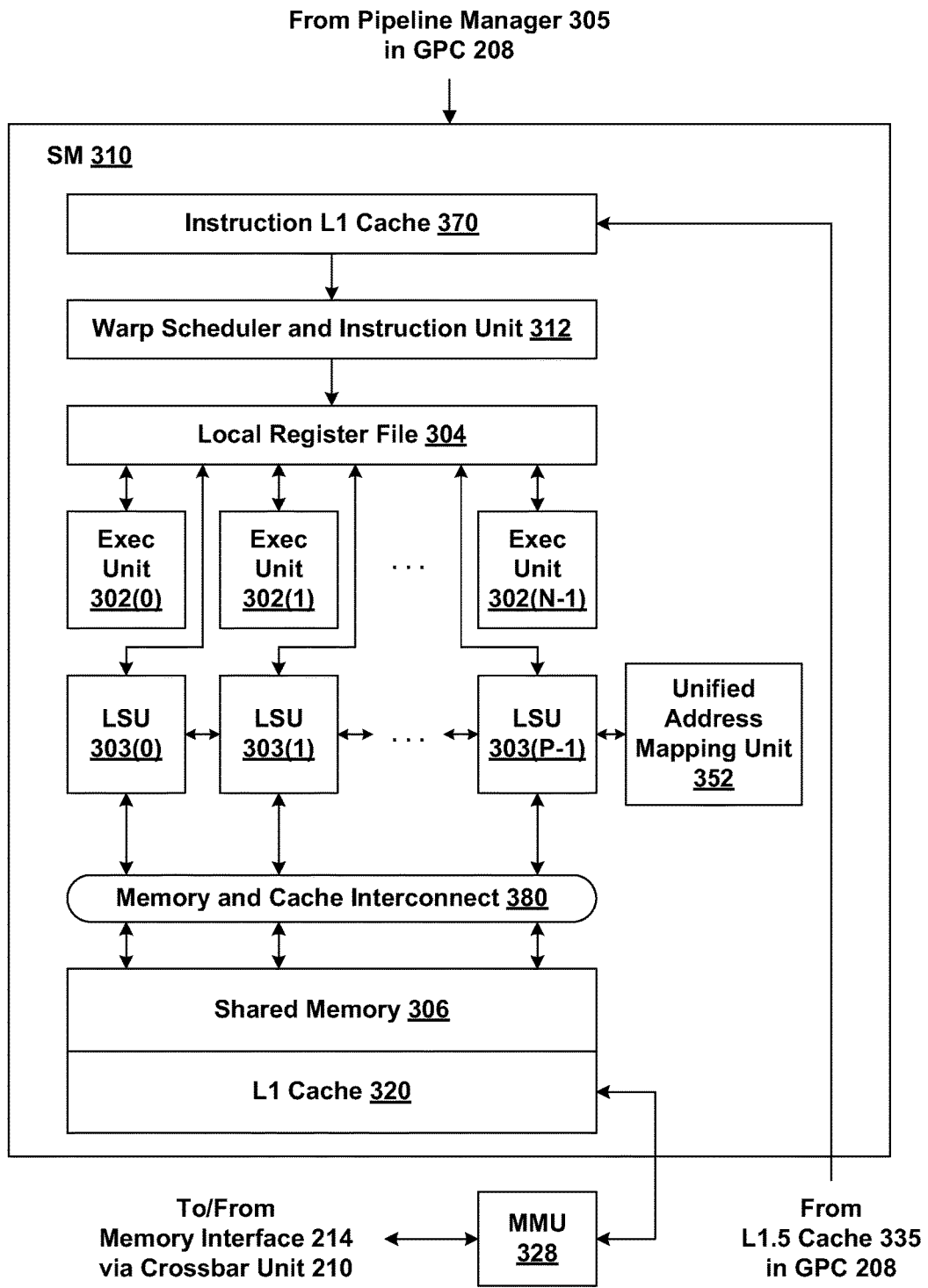
FIG. 3C illustrates a block diagram of a streaming multiprocessor within one of the graphics processing clusters of FIG. 2, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Implementing L2 Cache Thresholds

Figure 4:
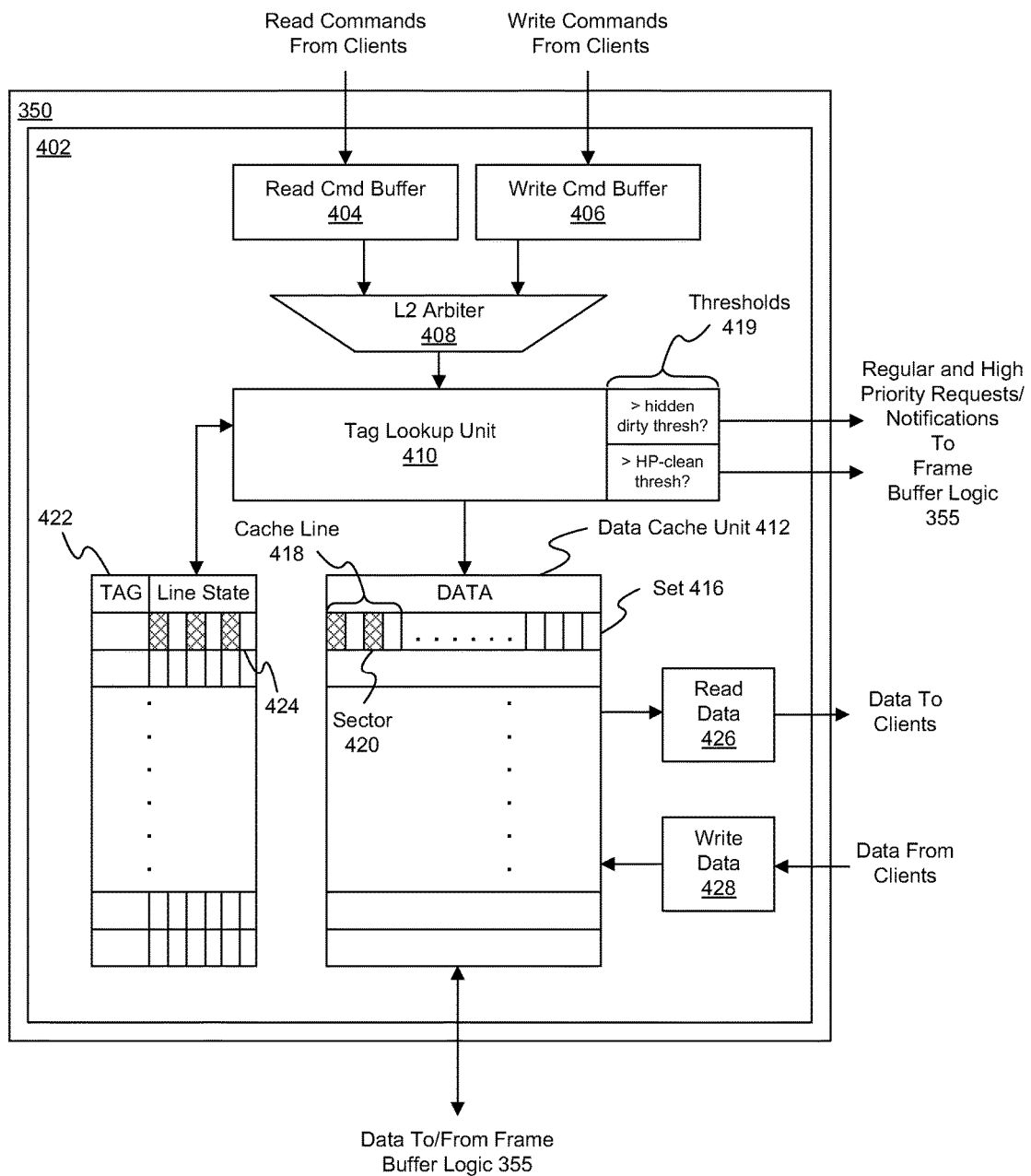
FIG. 4 is a detailed block diagram of a level 2 (L2) cache slice that resides within the L2 cache of FIG. 3B, according to one embodiment of the present invention.

FIG. 4 is a detailed block diagram of an L2 cache slice 402 that resides within the L2 cache 350 of FIG. 3B, according to one embodiment of the present invention. As described in conjunction with FIG. 3B, the L2 cache 350 may be split into two or more slices for more efficient processing of read and write commands. The L2 cache slice 402 is one such slice of the L2 cache 350. The L2 cache slice 402 includes a read command buffer 404, a write command buffer 406, an L2 arbiter unit 408, a tag look-up unit 410, a data cache unit 412, a tag store 422, a read data buffer 426 and a write data buffer 428.

In operation, the L2 cache slice 402 receives read and write commands from various clients within the parallel processing subsystem 112, such as the GPCs 208 and the ROP 360. Each of the command buffers receive requests from one or more clients and the L2 arbiter unit 408 ensures that requests from each buffer can proceed even if commands from a different buffer are stalled or blocked for any reason. The command buffers are FIFO (first-in-first-out) buffers, that is, the commands are output from the buffers in the same order they are received from the clients. The read command buffers are coupled to the L2 arbiter unit 408. The L2 arbiter unit 408 uses standard arbitration techniques to select a given command from the command buffers and transmit the selected command to the tag look-up unit 410 for processing.

Each read/write command received by the tag look-up unit 410 includes a memory address indicating the memory location within the DRAM 220 where the data associated with that read/write command is stored. The data associated with a write command is also transmitted to the write data buffer 428 for storage. Within the parallel processing subsystem 112, the L2 cache 350, among other uses, is used as an intermediary memory store for data associated with read/write commands being retrieved from or transmitted to the DRAM 220. The tag look-up unit 410 determines memory space availability within the data cache unit 412 to store the data associated with the read/write commands received from the L2 arbiter unit 408.

In one embodiment, the data cache unit 412 is a physically-indexed and tagged 64 KB (kilobyte) set associative data cache. In such an embodiment, the data cache unit 412 is divided into thirty-two sets, such as set 416, where each set is uniquely identified by a set identifier. Each set includes sixteen cache lines, such as cache line 418 in set 416, where each cache line may be associated with a different memory address tag. Each cache line has four sectors of thirty-two bytes each, such as sector 420 in cache line 418. The data associated with one read/write command may be stored in a specific sector within a particular associated cache line related to a specific set in the data cache unit 412.

Upon receiving a read/write command, the tag look-up unit 410 analyzes pre-determined portions of the memory address included in the read/write command to extract a set identifier, a tag portion and a sector identifier from the memory address. The extracted set identifier identifies a particular set within the data cache unit 412 (referred to herein as the "identified set") corresponding to the read/write command. The extracted tag portion of the memory address identifies a particular associated cache line related to the identified set. The sector identifier identifies a specific sector (referred to herein as the "identified sector") within the associated cache line where the data associated with the read/write command should be stored. The tag look-up unit 410 then determines whether a cache line related to the identified set is associated with the extracted tag portion of the memory address included in the read/write command.

The tag look-up unit 410 searches the different entries of the tag store 422 to determine the sector and cache line availability of a set of the data cache unit 412. The tag store 422 includes, for each set of data of the data cache unit 412, an entry for each of the sixteen cache lines. Each entry in the tag store 422 includes a tag section and a line state section. If the cache line corresponding to that entry is associated with a particular tag portion of a memory address included in a previously received read/write command, then the tag section of that entry stores that particular tag portion of the memory address. If the cache line state corresponding to that entry is not associated, then the tag portion is not valid.

The line state section in an entry within the tag store 422 indicates the state of each of the sectors in the cache line corresponding to that entry. The line state includes several bits to indicate the full status, dirty status and pinned status of each sector of a cache line. Full state indicates that a sector is fully valid and already holds all data necessary to service a read request. The dirty state indicates that the line holds dirty data that has been modified by a write request. The pinned state indicates that a line has outstanding uncompleted requests in flight and that more updates to the line state are pending. There is additional state stored in the tag lookup unit to track other cache line state, e.g., if a fill request for a miss has been issued to frame buffer or if frame buffer has been notified of dirty data or asked to send said dirty data to the DRAM memory with high priority. For example, if the entry 424 within the tag store 422 corresponds to the cache line 418 within the data cache unit 412, then the tag section of the entry 424 stores the tag portion of the memory address included in a previously received read/write command associated with the cache line 418. The line state section in the entry 424 indicates the nature of the data stored—if any—within the four sectors of the cache line 418.

To determine whether a cache line related to the identified set is associated with the extracted tag portion of the memory address included in the read/write command, the tag look-up unit 410 searches the set specified by the address of the request for an entry where the tag portion matches the extracted tag portion. When an entry in the tag store 422 matches in this fashion, the cache line corresponding to that entry is already associated with the extracted tag portion of the memory address included in the read/write command. If such an entry does not exist in the tag store 422, then the tag look-up unit 410 searches the tag store within that set for lines eligible for eviction. The tag look-up unit 410 uses a least-recently-used policy to select the candidate for eviction from within the group of eligible lines. Lines that are dirty or pinned cannot be evicted. Alternatively, lines that hold no data or only fully valid data are eligible for eviction.

If the tag look-up unit 410 can't find enough cache resources to service a request, the tag look-up unit will be temporarily rejected and retried at a later point in time. In the case of a write command, if the number of associated cache lines related to the identified set that include dirty data is equal to a pre-determined maximum dirty threshold, then the tag look-up unit 410 stalls the write command until the pre-determined maximum dirty threshold is no longer exceeded. The number of associated cache lines (that store dirty data) related to the identified set becomes less than the pre-determined maximum dirty threshold when the frame buffer logic 355 cleans the associate cache lines according to the techniques described herein. As previously described, the L2 cache 350 is an intermediary store for data being retrieved from, in the case of read commands, and transmitted to, in the case of write commands, the DRAM 220. The L2 cache 350 also stores other types of data that are needed by the different components of the parallel processing subsystem 112, such as circular buffer data needed by the GPCs 208. The pre-determined maximum dirty threshold is a configurable threshold that limits how many cache lines related to a particular set can store a particular type of data. This helps ensure cache line availability for other types of data that may be needed by the different components of the parallel processing subsystem 112.

In other embodiments of the present invention, the tag look-up unit 410, when processing a read/write command, may implement one or more different pre-determined maximum thresholds, where each pre-determined maximum threshold limits a number of cache lines related to a particular set that store a particular type of data. For example, the tag look-up unit 410 may implement a pre-determined maximum read threshold that limits the number of cache lines within a particular set that may be associated by the tag look-up unit 410 to service outstanding read requests. In such a case, if the number of associated cache lines related to the particular set that includes outstanding reads is equal to the pre-determined maximum read threshold, then the tag look-up unit 410 would reject the new read commands until the number of associated cache lines that include active reads is less than the pre-determined maximum read threshold—which, as set forth above, would occur when the frame buffer logic 355 services enough of the outstanding fill requests and the read data has been returned by the L2 cache.

An entry in the tag store 422 where the dirty status and the pinned status in the line state section are clear corresponds to an available cache line related to the extracted set identifier. Available cache lines related to the identified set may be associated with the different tag portions of memory addresses included in read/write commands. The tag look-up unit 410 selects an available cache line related to the identified set and associates the selected cache line with the extracted tag portion of the memory address included in the read/write command. The tag section of the entry in the tag store 422 corresponding to the selected cache line is then updated to store the extracted tag portion of the memory address included in the read/write command.

Once an available cache line is associated with the extracted tag portion of the memory address included in the read/write command, the tag look-up unit 410 reserves the identified sector in the associated cache line for the data associated with the read/write command. To reserve the identified sector, the tag look-up unit 410 marks the corresponding pinned state in the line state section of the entry in the tag store 422 corresponding to the associated cache line as valid. If the read/write command is a read command, then the tag look-up unit 410 transmits a read fill request to the frame buffer logic 355 and sets the pending bit. The read fill request is then transmitted to the DRAM 220 for processing at a later clock cycle.

However, if the read/write command is a write command, then the tag look-up unit 410 causes the data associated with the write command stored in the write data buffer 428 to be transmitted to the reserved sector within the associated cache line. As described above, read fill requests are automatically transmitted by the tag look-up unit 410 to the frame buffer logic 355 for each received read command. Similarly, according to conventional approaches, dirty data notifications are automatically transmitted by the tag look-up unit 410 to the frame buffer logic 355 for each received write command. However, embodiments of the present invention add new logic to the tag look-up unit 410 that cause the tag look-up unit 410 to check whether a particular threshold is exceeded—referred to herein as the "hidden dirty threshold"—before transmitting a dirty data notification to the frame buffer logic 355 when a write command is received.

More specifically, in one embodiment, the tag look-up unit 410 is configured to count the number of dirty cache lines in a set 416 and then compare the number of dirty cache lines against the hidden dirty threshold after a write command is received and processed by the tag look-up unit 410. Thus, a number of dirty lines that are not exposed to the frame buffer logic can remain in the cache below the hidden dirty threshold. In one embodiment, the hidden dirty threshold is an adjustable value that can be fine-tuned to control when dirty data notifications are sent to the frame buffer logic 355. As described herein, configurability of the hidden dirty threshold provides the non-obvious advantage of preventing dirty data notifications from being transmitted to the frame buffer logic 355 when the dirty data notifications are irrelevant, e.g., when data in one or more cache lines is updated many times (via multiple write commands) and only the resultant data is important.

When the number of dirty cache lines in a set 416 is equivalent to or exceeds the hidden dirty threshold, then the tag look-up unit 410 transmits to the frame buffer logic 355 a dirty data notification for the least-recently used (LRU) dirty line in the set 416. For example, if the hidden dirty threshold is set to a value of five, and, upon receipt and processing of a new write command, a fifth total associated cache line in the set 416 is dirtied, then the tag look-up unit 410 will issue a dirty data notification to the frame buffer logic 355 for the LRU dirty line in the set 416.

As is described in greater detail herein, each dirty data notification includes information about the associated cache line to which the dirty data notification corresponds, where that associated cache line includes dirty data that was received via a write command. The frame buffer logic 355 receives these dirty data notifications and schedules them for processing. In doing so, the frame buffer logic 355 opportunistically pulls the dirty data from dirty cache lines in the set 416 and then transmits the dirty data to the DRAM 220. As a result, one or more dirty cache lines in the set 416 are cleaned, which affects whether or not the hidden dirty threshold is still being exceeded. The opportunistic cleaning is executed by the frame buffer logic 355 according to the techniques described below in conjunction with FIGS. 5 and 6A-6B. Accordingly, the hidden dirty threshold provides the non-obvious advantage of enabling the L2 to behave like a write-through cache (i.e., when the hidden dirty threshold is zero or a small number) or a write-back cache (i.e., when the hidden dirty threshold is a large number).

Embodiments of the invention include yet another configurable threshold for high-priority cleans (referred to herein as the "high-priority clean threshold"). More specifically, in one embodiment, the tag look-up unit 410 determines, after an available cache line is associated, if the number of associated cache lines that include dirty data related to the identified set is greater than the high-priority clean threshold. If so, then the tag look-up unit 410 transmits a high-priority clean notification to the frame buffer logic 355. The high-priority clean notification alerts the frame buffer logic 355 that the number of associated cache lines that include dirty data related to the identified set is approaching the pre-determined maximum dirty threshold. In response to the high-priority clean notification, the frame buffer logic 355 is configured to retrieve dirty data stored in the associated cache lines related to the identified set. Once the frame buffer logic 355 has fetched the dirty data from a given sector in the cache, the dirty bit for the sector is cleared. Retrieving dirty data in this manner reduces the likelihood of read/write command stalls due to the predetermined maximum dirty threshold, previously described herein, from being reached.

In some cases, and as described in further detail below, a write command received by the tag look-up unit 410 may cause both the hidden dirty threshold and the high-priority clean threshold to be triggered at the same time. In one embodiment, tag look-up unit 410 is configured to simultaneously transmit both a dirty data notification as well as a high-priority clean notification via a single notification to the frame buffer logic 355, thereby minimizing bandwidth usage and increasing overall efficiency of communication between the tag look-up unit 410 and the frame buffer logic 355.

The frame buffer logic 355 prioritizes and processes the dirty data notifications, read fill requests and high-priority clean notifications periodically received from the tag look-up unit 410 and transmits corresponding read/write commands to the DRAM 220. Data associated with a write command is retrieved from the corresponding sector in the data cache unit 412 and stored in the corresponding bank page within the DRAM 220, thereby cleaning that data. When dirty data is cleaned, the dirty bit within the line state section in the tag store 422 corresponding to the sector storing the clean data is cleared. The sector storing the clean data may be reserved to store data associated with a future read or write command. Data associated with the read command is retrieved from the corresponding bank page within the DRAM 220 and stored in the reserved sector within the data cache unit 412 associated with the read command. The data associated with the read command is then transmitted to the read data buffer 426 from the reserved sector, and the pinned bit within the line state section in the tag store 422 corresponding to the sector storing the data is cleared. The data associated with the read command is stored in the read data buffer 426 until the data is transmitted to the client that transmitted the read command.

When all the dirty, full and pinned status within the line state section of an entry in the tag store 422 corresponding to the associated cache line are cleared, the tag look-up unit 410 disassociates the cache line with the memory address tag stored in the tag section of that entry. A cache line whose line state only indicates full may also be immediately disassociated in case no empty line is available, and a new request must be allocated in the cache. Upon association, the tag section of the selected entry is loaded with the new memory address tag and the line state is cleared and pinned status is set. Data associated with the previous tag is implicitly discarded as the line state no longer indicates that the data is present.

Upon receiving a read/write command, if the tag look-up unit 410 determines that a cache line related to the identified set is already associated with the extracted tag portion of the memory address included in the read/write command, then the tag look-up unit 410 determines whether the identified sector in the associated cache line is already reserved. If so, in the case of read commands, the tag look-up unit 410 causes the data stored in the identified sector to be transmitted to the read data buffer 426. The data is stored in the read data buffer 426 until that data is transmitted to the client that transmitted the read command. In the case of write commands, the tag look-up unit 410 causes the data associated with the write command stored in the write data buffer 428 to be transmitted to the reserved sector in the associated cache line. If, however, the identified sector is not reserved, the tag look-up unit 410 reserves the identified sector and transmits a read fill request.

In other embodiments, the line state section of an entry in the tag store 422 may be implemented in any technically feasible fashion, including, without limitation, as a single bit to indicate when data in the cache line corresponding to the entry is clean and unpinned. Persons skilled in the art will therefore understand that nothing included in the descriptions herein is intended to limit the scope of the present invention.

In certain embodiments, read commands may be transmitted to the L2 cache slice 402 by the clients within the parallel processing subsystem 112 where the data associated with those commands is retrieved from system memory 104 or a memory associated with another GPU (or PPU) within the computer system 100 and stored temporarily in the data cache 414, as opposed to being retrieved from the parallel processing memory 204 coupled to FB 355, as previously described herein. Similarly, in certain embodiments, write commands may be transmitted to the L2 cache slice 402 by the GPCs 208 or the ROP 360 where the data associated with those commands is temporarily stored in the data cache 414 before being written to system memory 104 or a memory associated with another GPU (or PPU) within the computer system 100, as opposed to being written to the parallel processing memory 204 coupled to FB 355, as previously described herein. In all such embodiments, the manner in which the data associated with the read or write commands is cached in and evicted from the data cache 414, as described herein, remains unchanged.

Figure 5:
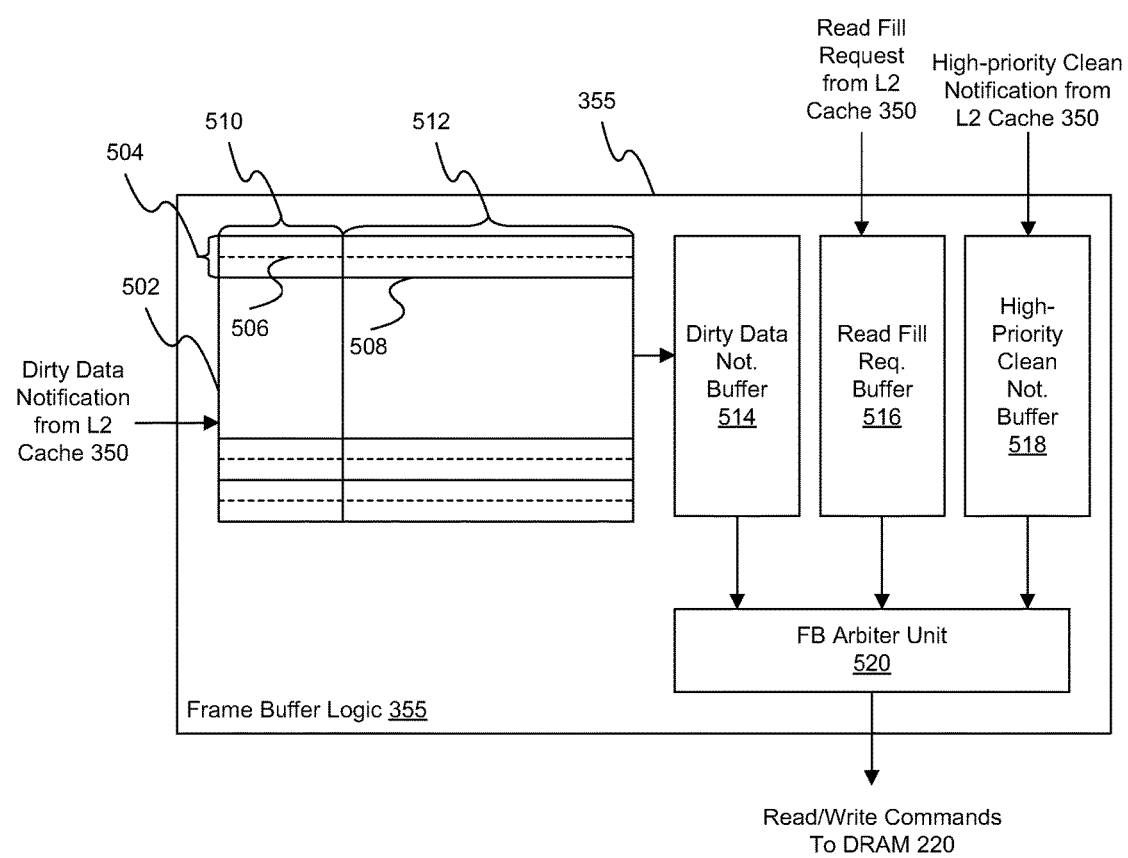
FIG. 5 is a detailed block diagram of the frame buffer logic of FIG. 3B, according to one embodiment of the present invention.

FIG. 5 is a detailed block diagram of the frame buffer logic 355 of FIG. 3B, according to one embodiment of the present invention. As shown, the frame buffer logic 355 includes a dirty data notifications sorter 502, a dirty data notifications buffer 514, a read fill requests buffer 516, a high-priority clean notifications buffer 518 and a frame buffer arbiter unit 520.

As described in conjunction with FIG. 4, the tag look-up unit 410 transmits a dirty data notification to the frame buffer logic 355 when dirty data is written to a sector in the data cache unit 412 and the hidden dirty threshold is met or exceeded. Using the dirty data notifications sorter 502, the frame buffer logic 355 is configured to manage the dirty data notifications received from the tag look-up unit 410. Again, the particular cache line in which dirty data is stored is determined by the tag look-up unit 410 using the memory address included in the write command associated with that dirty data. The memory address also reflects the particular data block within a bank page in the DRAM 220 where the dirty data should be stored.

The dirty data notifications sorter 502 includes thirty-two sets, such as set 504, each set including two entries, such as entries 506 and 508 within set 504. Each bank page in the DRAM 220 maps to only one set within the dirty data notifications sorter 502. Each entry in a set within the dirty data notifications sorter 502 may be associated with one bank page in the DRAM 220 that maps to that set, such that, at any given clock cycle, a maximum of sixty-four bank pages may be tracked by the dirty data notifications sorter 502. An entry within the dirty data notifications sorter 502 includes a bank page number portion 510 and a notifications portion 512. An entry that is associated with a specific bank page stores the bank page number identifying that bank page in the bank page number portion 510. The dirty data notifications received by the frame buffer logic 355 associated with that bank page are stored in the notifications portion 512.

Upon receiving a dirty data notification from the tag look-up unit 410 when the hidden dirty threshold is triggered, the frame buffer logic 355 analyzes the memory address included in the dirty data notification to extract the bank page number corresponding to the specific bank page in which the dirty data should be stored. The frame buffer logic 355 also extracts the set index within the dirty data notifications sorter 502 that should include the entry corresponding to that specific bank page. The frame buffer logic 355 then retrieves the entries that are within the set identified by the extracted set index. The frame buffer logic 355 compares the extracted bank page number with the bank page numbers included in the bank page number portion 510 of the entries retrieved from that set. In the case that the extracted bank page number matches a bank page number portion included in one of the entries in that set, the frame buffer logic 355 stores the dirty data notification in the notifications portion 512 of that entry. In the case that the extracted bank page number does not match a bank page number portion included in any of the entries in that set, an available entry in that set is associated with the bank page associated with the extracted bank page number. The frame buffer logic 355 then stores the dirty data notification in the notifications portion 512 of the newly associated entry.

The frame buffer logic 355 implements two configurable thresholds to manage the dirty data notifications stored in the dirty data notifications sorter 502. At any given clock cycle, the dirty data notifications sorter 502 determines the number of dirty data notifications stored in the notifications portion 512 of each associated entry within the notifications sorter 502. For each associated entry, if the number of dirty data notifications is greater than a pre-determined notifications threshold, then the dirty data notifications sorter 502 transmits the dirty data notifications stored in the notifications portion 512 of that entry to the dirty data notifications buffer 514. The notifications threshold ensures that the number of dirty data requests transmitted by the frame buffer logic 355 to a bank page, once the bank page is activated, meet the minimum efficiency requirements of the DRAM 220. The notifications threshold also ensures that dirty data stored in the different sectors in the data cache unit 412 associated with a particular bank page is retrieved from the data cache unit 412 at the earliest possible clock cycle, thereby cleaning the sectors storing that dirty data.

Also, at any given clock cycle, the dirty data notifications sorter 502 determines the number of associated entries in each set. If the number of associated entries in a given set is greater than one, the dirty data notifications sorter 502 transmits the dirty data notifications stored in the notifications portion 512 of the older entry to the dirty data notifications buffer 514. This approach ensures that there is space availability in each set in the dirty data notifications sorter 502 for a different bank page that may be associated with that set.

The read fill requests transmitted by the tag look-up unit 410 when data associated with a read command is not available within the data cache unit 412 are stored in the read fill requests buffer 516. Similarly, the high-priority clean notifications transmitted by the tag look-up unit 410 when the number of associated cache lines related to a particular set within the data cache unit 412 is equal to a high-priority clean threshold are stored in the high-priority clean notifications buffer 518.

The frame buffer arbiter unit 520 implements standard arbitration techniques to determine the order in which the requests/notifications stored in the dirty data notifications buffer 514, the read fill requests buffer 516 and the high-priority clean notifications buffer 518 are selected for further processing. In one embodiment, the frame buffer arbiter unit 520 selects the first request/notification stored in each of the dirty data notifications buffer 514, the read fill requests buffer 516 and the high-priority clean notifications buffer 518 in a round-robin fashion. In another embodiment, the frame buffer arbiter unit 520 may select notifications from the high-priority clean notifications buffer 518 at a higher priority than notifications/requests stored in the dirty data notifications buffer 514 and the read fill requests buffer 516. The frame buffer arbiter unit 520 transmits the read/write commands associated with the selected dirty data notification, read fill request or high-priority clean notification to the DRAM 220 for further processing.

Data associated with a write command is retrieved from the corresponding sector in the data cache unit 412 and stored in the corresponding bank page within the DRAM 220, thereby cleaning that data. When dirty data is cleaned, the dirty bit within the line state section in the tag store 422 corresponding to the sector storing the clean data is cleared. The sector storing the clean data may be reserved to store data associated with a future read or write command. Data associated with the read command is retrieved from the corresponding bank page within the DRAM 220 and stored in the reserved sector within the data cache unit 412 associated with the read command. When the data is stored in the reserved sector, the pinned bit within the line state section in the tag store 422 corresponding to the reserved sector is cleared. The data associated with the read command is then transmitted to the read data buffer 426 from the reserved sector until the data is transmitted to the client that transmitted the read command. When the data associated with the read command is transmitted to the read data buffer 426, the full bit within the line state section in the tag store 422 corresponding to the sector from which the data is transmitted is cleared.

Again, when all the dirty, full and pinned status within the line state section of an entry in the tag store 422 corresponding to an associated cache line are cleared, the tag look-up unit 410 may disassociate the cache line with the tag portion of a memory address in the tag section of that entry so that the entry may be associated with the tag portion of a different memory address included in a read/write command at a later clock cycle.

Figure 6A:
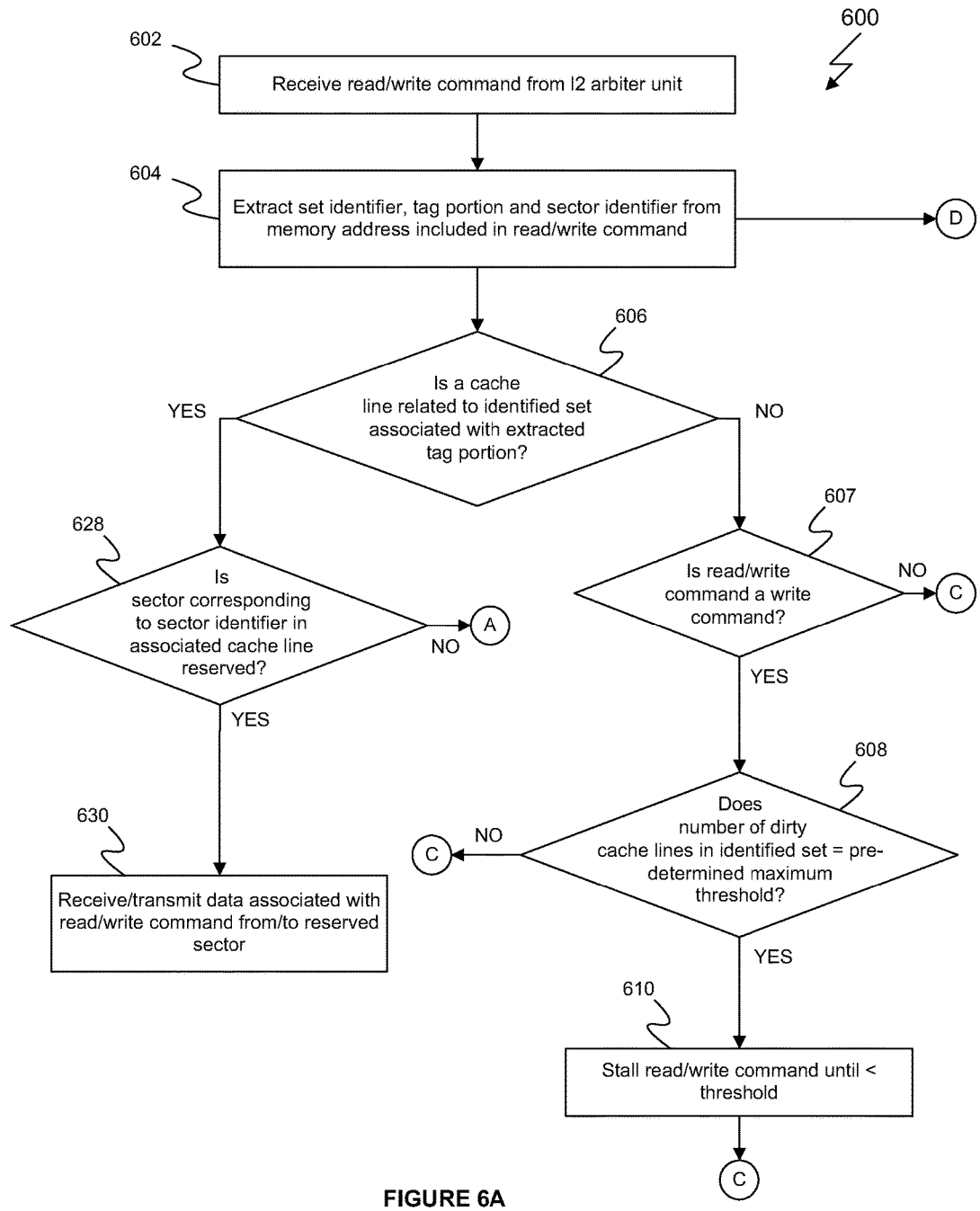
FIGS. 6A and 6B set forth a flow diagram of method steps for processing a read/write command received by the L2 cache slice of FIG. 4, according to one embodiment of the present invention.
Figure 6B:
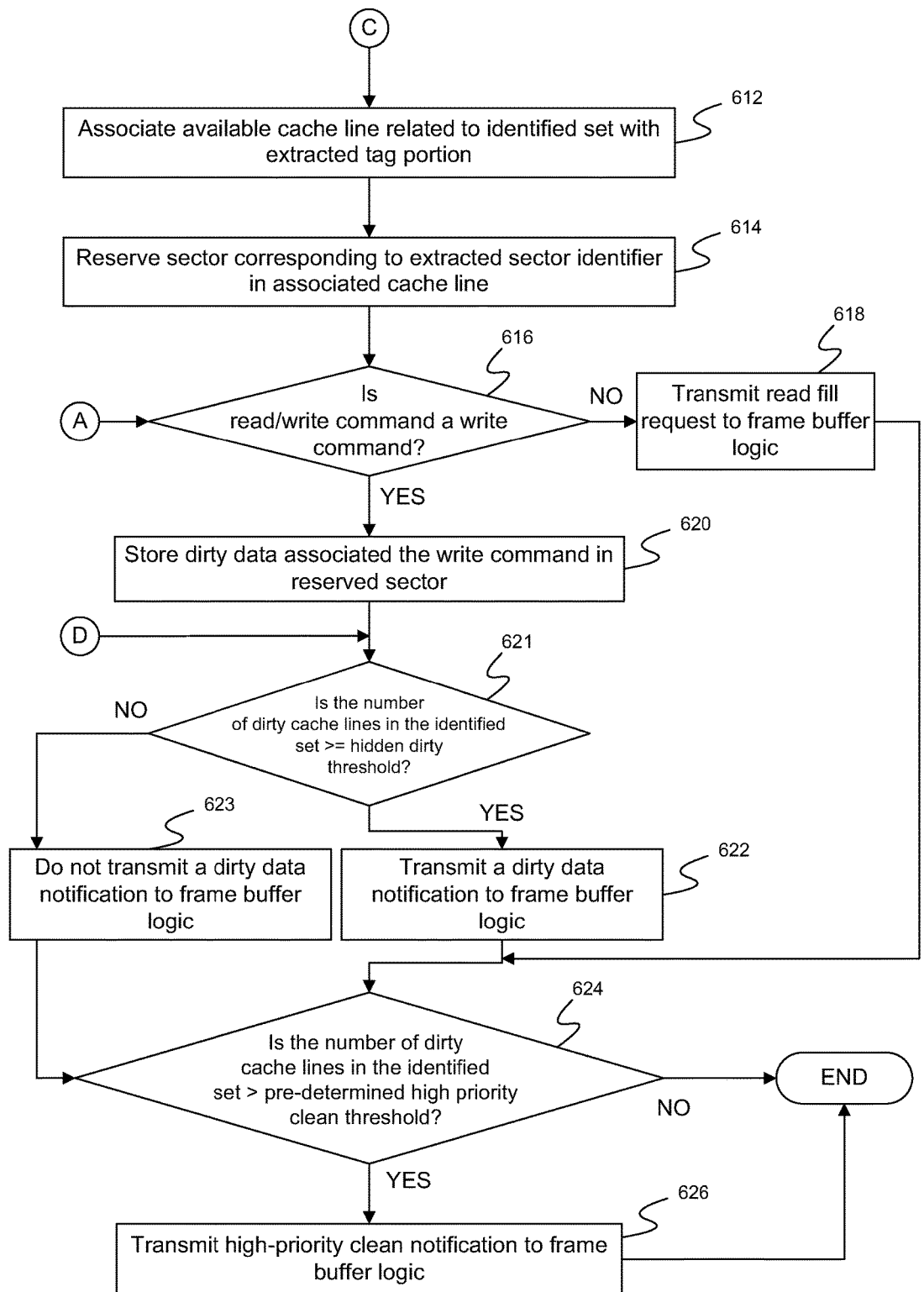

FIGS. 6A and 6B set forth a flow diagram of method steps for processing a read/write command received by the L2 cache slice 402 of FIG. 4, according to one embodiment of the present invention. Although the method steps are described in conjunction with the systems of FIGS. 1-5, persons skilled in the art will understand that any system configured to perform the method steps, in any order, is within the scope of the invention.

The method 600 begins at step 602, where the tag look-up unit 410 receives a read/write command from the L2 arbiter unit 408. As described in conjunction with FIG. 4, various clients within the parallel processing subsystem 112 may transmit read/write commands to the L2 cache slice 402 for processing. The read commands are stored in the read command buffer 404, and the write commands are stored in the write command buffer 406, until the commands are selected by the L2 arbiter unit 408 for processing. The L2 arbiter unit 408 selects a read/write command using standard arbitration techniques and transmits the selected read/write command to the tag look-up unit 410 for further processing.

At step 604, the tag look-up unit 410 extracts a set identifier, a tag portion and a sector identifier from the memory address included in the read/write command. As previously described, the extracted set identifier identifies the set in the data cache unit 412 that may include the memory address, and the extracted tag portion identifies a cache line within the data cache unit 412 that can be associated with the tag portion of the memory address included in the read/write command. The data associated with the read/write command is stored in a specific sector, identified by the sector identifier, of the associated cache line. Method 600 then splits to both step 606 and step 621 (illustrated in FIG. 6B) since the processing of received read/write request is executed independent to the transmission of dirty notifications that are sent out (or withheld) in response to receiving the read/write requests. The details of step 621 onward are discussed in detail below.

At step 606, the tag look-up unit 410 searches the tag store 422 to determine whether a cache line related to the identified set is associated with the extracted tag portion of the memory address. The tag look-up unit 410 examines the different entries in the set to determine whether there is an entry where the tag section matches the extracted tag. As described herein, when the tag portion of the memory address matches a tag section in the specified set of the tag store 422 in this fashion, the cache line corresponding to that entry is already associated with the tag portion of the memory address included in the read/write command. At step 606, if such an entry does not exist, then there is no cache line related to the identified set associated with the extracted tag portion of the memory address included in the read/write command, and the method 600 proceeds to step 607.

At step 607, the tag look-up unit 410 determines whether the read/write command is a write command. If so, then the method 600 proceeds to step 608 where the tag look-up unit 410 searches the tag store 422 to determine how many of the cache lines in the identified set are associated with the tag portions of the memory addresses included in any read/write commands previously received by the tag look-up unit 410 and include dirty data. If the number of associated cache lines related to the identified set that include dirty data is equal to a pre-determined maximum dirty threshold, then the method 600 proceeds to step 610. At step 610, the write command is stalled until the number of associated cache lines related to the identified set that include dirty data becomes less than the pre-determined maximum dirty threshold and the method 600 proceeds to step 612.

Referring back now to step 607, if the tag look-up unit 410 determines that the read/write command is a read command, then the method 600 proceeds directly to step 612, previously described herein. An entry in the specified set of the tag store 422 where the state bits are cleared for all sectors corresponds to an available cache line in the identified set. An available cache line in the identified set may be associated with the tag portion of a memory address included in a read/write command the current clock cycle. Referring to FIG. 6B, at step 612, the tag look-up unit 410 selects an available cache line in the identified set and associates the selected cache line with the tag portion of the memory address included in the read/write command and extracted at step 604. The tag section of the entry in the tag store 422 corresponding to the selected cache line in the identified set is updated to include the extracted tag portion of the memory address included in the read/write command. At step 614, the identified sector in the associated cache line is reserved for the data associated with the read/write command. To reserve the identified sector, the tag look-up unit 410 sets the appropriate pinned bit in the line state section of the entry in the tag store 422 corresponding to the associated cache line.

At step 616, the tag look-up unit 410 determines whether the read/write command is a write command. If so, then at step 620, the tag look-up unit 410 causes the data associated with the write command to be transmitted from the write data buffer 428 to the reserved sector. The tag look-up unit 410 then sets the dirty data bit in the line state section of the entry in the tag store 422 corresponding to the associated cache line. Next, method 600 proceeds to step 621, where the tag look-up unit 410 determines whether the number of dirty cache lines in the identified set is greater than or equal to the hidden dirty threshold. If, at step 621, the tag look-up unit 410 determines that the number of dirty cache lines is less than the hidden dirty threshold, then method 600 proceeds to step 623, and the tag look-up unit 410 does not transmit a dirty data notification to the frame buffer logic 355. Otherwise, method 600 proceeds to step 622, where the tag look-up unit 410 transmits to the frame buffer logic 355 a dirty data notification that corresponds to the LRU dirty cache line in the identified set. Thereafter, the frame buffer logic 355 receives, prioritizes and processes the dirty data notification according to the techniques described herein.

Referring back now to step 616, if the tag look-up unit 410 determines that the read/write command is a read command, then at step 618, the tag look-up unit 410 transmits a read fill request to the frame buffer logic 355 and sets the pinned bit in the line state section of the entry in the tag store 422 corresponding to the associated cache line. The read fill request includes the memory address included in the read command and notifies the frame buffer logic 355 that data associated with the read command needs to be retrieved from the DRAM 220 and stored in the newly reserved sector. The frame buffer logic 355 prioritizes and processes the read fill request and the data associated with the read command is returned and stored in the reserved sector at a later clock cycle.

At step 624, the tag look-up unit 410 searches the tag store 422 to determine how many of the cache lines in the identified set are associated with the tag portions of the memory addresses included in any read/write commands previously received by the tag look-up unit 410. If, at step 624, the number of associated cache lines that include dirty data and are in the identified set is greater than a high-priority clean (HPC) threshold, then, at step 626, the tag look-up unit 410 transmits a high-priority clean notification to the frame buffer logic 355. The high-priority clean notification alerts the frame buffer logic 355 that the number of associated cache lines related to the set identified at step 604 that store dirty data is approaching the pre-determined maximum dirty threshold. In response to the high-priority clean notification, the frame buffer logic 355 can retrieve dirty data stored in the associated cache lines in the identified set. Retrieving dirty data preemptively reduces the likelihood of read/write command stalls due to the pre-determined maximum dirty threshold being reached. After step 626, or if at step 624, the number of associated cache lines in the identified set is less than or equal to the high-priority clean threshold, then the method 600 terminates.

Referring back now to step 606 in FIG. 6A, if a cache line related to the identified set is already associated with the extracted tag portion of the memory address included in the read/write command, then, at step 628, the tag look-up unit determines whether the sector in the associated cache line identified by the extracted sector identifier is already reserved. If so, then at step 630, in the case of read commands, the tag look-up unit 410 causes the data stored in the identified sector to be transmitted to the read data buffer 426. The data is stored in the read data buffer 426 until that data is transmitted to the client that transmitted the read command. In the case of write commands, at step 630, the tag look-up unit 410 causes the data associated with the write command stored in the write data buffer 428 to be transmitted to the reserved sector in the associated cache line. The tag look-up unit 410 then sets the dirty data bit in the line state section of the entry in the tag store 422 corresponding to the associated cache line. However, if at step 632, the identified sector is not reserved, then the method 600 proceeds to step 620, previously described herein.

The dirty data notification transmitted to the frame buffer logic 355, at step 622, is stored in the dirty data notifications sorter 502 (FIG. 5). The read fill request transmitted to the frame buffer logic 355, at step 618, is stored in the read fill requests buffer 516. Similarly, the high-priority clean notification transmitted to the frame buffer logic 355, at step 626, is stored in the high-priority clean notifications buffer 518. In one embodiment, the frame buffer arbiter unit 520 selects a request/notification from the dirty data notifications buffer 514, the read fill requests buffer 516 or the high-priority clean notifications buffer 518 in a round-robin fashion. In another embodiment, the frame buffer arbiter unit 520 selects high-priority clean notifications stored in the high-priority clean notifications buffer 518 at a higher priority than notifications/requests stored in the dirty data notifications buffer 514 or the read fill requests buffer 516. The frame buffer arbiter unit 520 then transmits read/write commands corresponding to the selected request/notification to the DRAM 220 for processing.

In sum, upon receiving a read/write command, the tag look-up unit analyzes pre-determined portions of the memory address included in the read/write command to extract a set identifier, a tag portion of the memory address and a sector identifier. The extracted set identifier identifies a particular set within the data cache unit, and the extracted tag portion of the memory address identifies a particular associated cache line related to the identified set corresponding to the memory address. The sector identifier identifies a specific sector within the associated cache line where the data associated with the read/write command should be stored. The tag look-up unit 410 first determines whether a cache line related to the identified set is associated with the extracted tag portion of the memory address included in the read/write command. If such an associated cache line exists, then the tag look-up unit reserves the identified sector within the associated cache line to store the data associated with the read/write command.

If such an associated cache line does not exist, then the tag look-up unit determines the number of associated cache lines related to the identified set that include or store dirty data. Cache lines related to a particular set that are not dirty or pinned are available to be associated with tag portions of memory addresses included in future read/write commands. At any given clock cycle, the number of associated cache lines related to the identified set that store dirty data may not exceed a pre-determined maximum dirty threshold. In the case of write commands, if the number of associated cache lines related to the identified set that store dirty data is equal to the pre-determined maximum dirty threshold, then the tag look-up unit stalls the write command until the number of associated cache lines related to the identified set that store dirty data is less than the pre-determined maximum dirty threshold.

The tag look-up unit then associates an available cache line related to the identified with the tag portion of the memory address included in the read/write command. The tag look-up unit then reserves the identified sector within the newly associated cache line to store the data associated with the read/write command.

The hidden dirty threshold and the high-priority clean threshold may effect a reduction in the average number of stalls that occur due to cache line unavailability. The tag look-up unit 410 transmits a dirty data notification to the frame buffer logic when the number of dirty cache lines in a set is greater than or equal to the hidden dirty threshold. The tag look-up unit also transmits a high-priority clean notification to the frame buffer logic when the number of dirty cache lines related to the identified set reaches the high-priority clean threshold. The dirty data notification alerts the frame buffer logic that the L2 cache includes at least one associated cache line that stores dirty data and that should be cleaned. The high-priority clean notification alerts the frame buffer logic that the number of dirty cache lines related to the identified set is approaching the pre-determined maximum dirty threshold. In response to the dirty data notification, the high-priority clean notification—or both—the frame buffer logic retrieves dirty data stored in the associated cache lines related to the identified set. Preemptively retrieving dirty data reduces the likelihood of read/write command stalls due to the pre-determined maximum dirty threshold being reached.

The hidden dirty threshold and the high-priority clean threshold are adjustable values that can be fine-tuned to cause the L2 cache to behave like a write-through cache or a write-back cache, or a blend of the two. Setting the hidden dirty threshold at a high value (in order to promote a write-back cache) provides several benefits, which include substantially reducing traffic on the communication line between the L2 and the frame buffer by restricting the transmission of dirty data notifications from the L2 to the frame buffer. This saves power and bandwidth, and provides the additional advantage of preventing "scratch" data from ever being unnecessarily pushed from the L2 to DRAM. Alternatively, setting the hidden dirty threshold at a low value (in order to promote a write-through cache) provides several benefits with respect to particular scenarios, e.g., streaming workloads where a write-back cache would actually interfere with phased computations (e.g. block read, block write, block read). Instead, a write-through cache actually smoothes out the traffic between the L2 and frame buffer for such phased computations.

Moreover, the number and duration of halted read and write operations is reduced as the tag look-up unit transmits a high-priority clean notification to the frame buffer logic when the number of dirty cache lines related to a particular set reaches a pre-determined threshold. The frame buffer logic then retrieves dirty data and transmits read data preemptively, thereby reducing the likelihood of read/write command stalls. Further, the pre-determined threshold prevents all the cache lines related to a particular set to be associated so that a cache line is available to store data that is retrieved from or needs to be transmitted to the DRAM. Such a mechanism helps ensure cache line availability for other types of data, such as circular buffer data, that may be needed by the different components of the parallel processing subsystem.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

We claim:

1. A method for processing commands received by an intermediary cache from one or more clients, wherein the intermediary cache is coupled to an external memory via frame buffer logic, the method comprising:
   receiving a first write command from an arbiter unit, wherein the first write command specifies a first memory address;
   determining that a first cache line related to a set of cache lines included in the intermediary cache is associated with the first memory address;
   causing data associated with the first write command to be written into the first cache line;
   marking the first cache line as dirty;
   comparing a total number of cache lines marked as dirty in the set of cache lines to a first threshold value, wherein the first threshold value is adjustable from a first value to a second value that is greater than the first value, and, when the first threshold value equals the second value, fewer dirty data notifications are transmitted to the frame buffer logic when data is written to the first cache line multiple times via multiple write commands, relative to when the first threshold value equals the first value; and
   comparing the total number of cache lines marked as dirty to a second threshold value that is adjustable and is greater than the first threshold value, wherein:
   if the total number of cache lines marked as dirty is less than the first threshold value, then no dirty data notification is transmitted to the frame buffer logic,
   if the total number of cache lines marked as dirty is greater than or equal to the first threshold value but less than or equal to the second threshold value, then only a first dirty data notification is transmitted to the frame buffer logic that specifies a least recently used dirty cache line included in the set of cache lines, wherein the frame buffer logic is configured to, in response to receiving the first dirty data notification, assign a prioritization to the first dirty data notification and then schedule the first dirty data notification for processing according to the prioritization, and
   if the total number of cache lines marked as dirty is greater than the second threshold value, then both the first dirty data notification and a high-priority clean notification are transmitted to the frame buffer logic, wherein the frame buffer logic is configured to, in response to receiving the high-priority clean notification, immediately retrieve dirty data resident in one or more cache lines included in the set of cache lines,
   wherein each dirty data notification indicates a particular cache line and does not include any dirty data associated with the particular cache line.

2. The method of claim 1, wherein the frame buffer logic is configured to cause dirty data residing in the least recently used dirty cache line to be written to a corresponding entry in a dynamic random access memory serving as local memory to a graphics processing unit when the frame buffer logic processes the first dirty data notification.

3. The method of claim 1, wherein the first dirty data notification and the high-priority clean notification are transmitted to the frame buffer logic simultaneously via a single notification.

4. The method of claim 3, wherein the frame buffer logic is configured to process the high-priority clean notification before the dirty data notification.

5. The method of claim 1, further comprising comparing the total number of cache lines marked as dirty to a third threshold value that is greater than the second threshold value, wherein:
   if the total number of cache lines marked as dirty is greater than the second threshold value but less than the third threshold value, then both the first dirty data notification and a high-priority clean notification are transmitted to the frame buffer logic, and
   if the total number of cache lines marked as dirty is equal to the third threshold value, then the first write command is stalled.

6. The method of claim 1, wherein the first dirty data notification and the high-priority clean notification are transmitted separately as two different notifications to the frame buffer logic.

7. The method of claim 1, wherein adjusting the first threshold causes the intermediary cache to operate as a first type of cache included in a plurality of different types of caches.

8. The method of claim 7, wherein adjusting the first threshold value to a higher value than a current value causes the intermediary cache to operate as a write-back cache.

9. The method of claim 7, wherein adjusting the first threshold value to a lower value than a current value causes the intermediary cache to operate as a write-through cache.

10. The method of claim 1, wherein the first threshold is adjustable to a lesser value to allow a phased computation to be performed.

11. A non-transitory computer-readable storage medium storing instructions that, when executed by a processor, cause the processor to process commands received by an intermediary cache from one or more clients, wherein the intermediary cache is coupled to an external memory via frame buffer logic, by performing the steps of:
   receiving a first write command from an arbiter unit, wherein the first write command specifies a first memory address;
   determining that a first cache line related to a set of cache lines included in the intermediary cache is associated with the first memory address;
   causing data associated with the first write command to be written into the first cache line;

marking the first cache line as dirty;

comparing a total number of cache lines marked as dirty in the set of cache lines to a first threshold value, wherein the first threshold value is adjustable from a first value to a second value that is greater than the first value, and, when the first threshold value equals the second value, fewer dirty data notifications are transmitted to the frame buffer logic when data is written to the first cache line multiple times via multiple write commands, relative to when the first threshold value equals the first value; and comparing the total number of cache lines marked as dirty to a second threshold value that is adjustable and is greater than the first threshold value, wherein:

if the total number of cache lines marked as dirty is less than the first threshold value, then no dirty data notification is transmitted to the frame buffer logic, if the total number of cache lines marked as dirty is greater than or equal to the first threshold value but less than or equal to the second threshold value, then only a first dirty data notification is transmitted to the frame buffer logic that specifies a least recently used dirty cache line included in the set of cache lines, wherein the frame buffer logic is configured to, in response to receiving the first dirty data notification, assign a prioritization to the first dirty data notification and then schedule the first dirty data notification for processing according to the prioritization, and if the total number of cache lines marked as dirty is greater than the second threshold value, then both the first dirty data notification and a high-priority clean notification are transmitted to the frame buffer logic, wherein the frame buffer logic is configured to, in response to receiving the high-priority clean notification, immediately retrieve dirty data resident in one or more cache lines included in the set of cache lines, wherein each dirty data notification indicates a particular cache line and does not include any dirty data associated with the particular cache line.

12. The non-transitory computer-readable storage medium of claim 11, wherein the frame buffer logic is configured to cause dirty data residing in the least recently used dirty cache line to be written to a corresponding entry in a dynamic random access memory serving as local memory to a graphics processing unit when the frame buffer logic processes the first dirty data notification.

13. The non-transitory computer-readable storage medium of claim 11, wherein the first dirty data notification and the high-priority clean notification are transmitted to the frame buffer logic simultaneously via a single notification.

14. The non-transitory computer-readable storage medium of claim 13, wherein the frame buffer logic is configured to process the high-priority clean notification before the dirty data notification.

15. The non-transitory computer-readable storage medium of claim 11, further comprising comparing the total number of cache lines marked as dirty to a third threshold value that is greater than the second threshold value, wherein:

if the total number of cache lines marked as dirty is greater than the second threshold value but less than the third threshold value, then both the first dirty data notification and a high-priority clean notification are transmitted to the frame buffer logic, and if the total number of cache lines marked as dirty is equal to the third threshold value, then the first write command is stalled.

16. The non-transitory computer-readable storage medium of claim 11, wherein the first dirty data notification and the high-priority clean notification are transmitted separately as two different notifications to the frame buffer logic.

17. A system for processing commands received by an intermediary cache from one or more clients, wherein the intermediary cache is coupled to an external memory via frame buffer logic, the system comprising:

the external memory;

the frame buffer logic;

an arbiter unit; and the intermediary cache, wherein the intermediary cache includes a tag lookup unit that is configured to:

receive a first write command from the arbiter unit, wherein the first write command specifies a first memory address;

determine that a first cache line related to a set of cache lines included in the intermediary cache is associated with the first memory address;

cause data associated with the first write command to be written into the first cache line;

mark the first cache line as dirty;

compare a total number of cache lines marked as dirty in the set of cache lines to a first threshold value, wherein the first threshold value is adjustable from a first value to a second value that is greater than the first value, and, when the first threshold value equals the second value, fewer dirty data notifications are transmitted to the frame buffer logic when data is written to the first cache line multiple times via multiple write commands, relative to when the first threshold value equals the first value; and compare the total number of cache lines marked as dirty to a second threshold value that is adjustable and is greater than the first threshold value, wherein:

if the total number of cache lines marked as dirty is less than the first threshold value, then no dirty data notification is transmitted to the frame buffer logic, if the total number of cache lines marked as dirty is greater than or equal to the first threshold value but less than or equal to the second threshold value, then only a first dirty data notification is transmitted to the frame buffer logic that specifies a least recently used dirty cache line included in the set of cache lines, wherein the frame buffer logic is configured to, in response to receiving the first dirty data notification, assign a prioritization to the first dirty data notification and then schedule the first dirty data notification for processing according to the prioritization, and if the total number of cache lines marked as dirty is greater than the second threshold value, then both the first dirty data notification and a high-priority clean notification are transmitted to the frame buffer logic, wherein the frame buffer logic is configured to, in response to receiving the high-priority clean notification, immediately retrieve dirty data resident in one or more cache lines included in the set of cache lines, wherein each dirty data notification indicates a particular cache line and does not include any dirty data associated with the particular cache line.

18. The system of claim 17, wherein the tag lookup unit is further configured to compare the total number of cache lines marked as dirty to a third threshold value that is greater than the second threshold value, wherein:

if the total number of cache lines marked as dirty is greater than the second threshold value but less than the third threshold value, then both the first dirty data notification and a high-priority clean notification are transmitted to the frame buffer logic, and if the total number of cache lines marked as dirty is equal to the third threshold value, then the first write command is stalled.

19. The system of claim 17, wherein the first dirty data notification and the high-priority clean notification are transmitted separately as two different notifications to the frame buffer logic.

* * * * *